United States Patent [19]

Maresca

[11] Patent Number: 5,106,899
[45] Date of Patent: Apr. 21, 1992

[54] PLASTICIZED POLYPHENYLENE ETHER COMPOSITIONS

[75] Inventor: Louis M. Maresca, Vienna, W. Va.

[73] Assignee: General Electric Company, Selkirk, N.Y.

[21] Appl. No.: 629,920

[22] Filed: Dec. 19, 1990

[51] Int. Cl.$^5$ ............................................... C08K 5/07
[52] U.S. Cl. ................................... 524/372; 524/171; 524/209; 524/359; 524/370; 525/134
[58] Field of Search ................. 521/87, 88; 524/170, 524/171, 208, 209, 359, 368, 370, 372; 525/134

[56] References Cited

U.S. PATENT DOCUMENTS

| | | | |
|---|---|---|---|
| 3,327,017 | 6/1967 | Huang et al. | 525/134 |
| 4,629,490 | 9/1987 | Abolins | 524/371 |
| 4,968,749 | 11/1990 | Shibuya et al. | 525/134 |

FOREIGN PATENT DOCUMENTS 3110252 5/1988 Japan.

Primary Examiner—Paul R. Michl
Assistant Examiner—Tae H. Yoon
Attorney, Agent, or Firm—Lowe, Price, LeBlanc & Becker

[57] ABSTRACT

Polymer compositions comprise a polyphenylene ether resin and a plasticizer of the formula

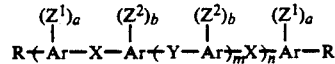

wherein X is selected from the group consisting $CH_2$, O and S; Y is different from X and is selected from the group consisting of $CH_2$, O, CO, S, SO and $SO_2$; Ar is an aromatic ring; $Z^1$ and $Z^2$ are individually selected from the group consisting of alkyl, alkoxide, aryl, aryl oxide, nitrile and nitro groups; R is hydrogen or an alkyl group; m is from 0 to 3; n is from 1 to about 10; and a and b are individually from 0 to 4; provided that both X and Y are not simultaneously oxygen. The compositions may further include a polystyrene resin, for example, a rubber-modified polystryene resin.

28 Claims, No Drawings

PLASTICIZED POLYPHENYLENE ETHER COMPOSITIONS

FIELD OF THE INVENTION

The present invention relates to polymer compositions comprising a polyphenylene ether resin and a plasticizing compound, which compositions exhibit an advantageous combination of properties including good flow or processability and good mechanical properties.

BACKGROUND OF THE INVENTION

Polyphenylene ether resins are well known in the art and exhibit a desirable combination of chemical, physical and electrical properties over a wide temperature range. This combination of properties renders polyphenylene ether resins suitable for use in a broad range of applications. Often times, polyphenylene ether resins are blended with other resins including various types of polystyrene resins in order to improve the processability or other properties of the polyphenylene ether resins and to increase their fields of application.

For example, the Cizek U.S. Pat. No. 3,383,435 discloses blends of polyphenylene ether and one or more styrene resins having improved properties. Additionally, the Lee U.S. Pat. No. 3,819,761 discloses compositions comprising a polyphenylene ether resin and a rubber modified polystyrene resin, which compositions provide molded articles having improvements in impact resistance, surface appearance and solvent resistance.

It is also known to blend polyphenylene ether resins with one or more additional additives for improving the processability, moldability and/or other properties of the resins. For example, Japanese Reference No. 60-258252 discloses polyphenylene ether resin compositions having improved moldability and which are prepared by mixing a polyphenylene ether resin with an aromatic compound. The compositions may further include one or more styrene resins.

Owing to the increasing use of polyphenylene ether resin compositions in various applications, there is a continuing demand for polyphenylene ether resin compositions having improved chemical and/or mechanical properties.

SUMMARY OF THE INVENTION

Accordingly, it is an object of the present invention to provide polyphenylene ether resin compositions having improved properties. It is a more specific object of the invention to provide polyphenylene ether resin compositions having improved flow or processability. It is an additional object of the invention to provide polyphenylene ether resin compositions having improved flow or processability together with good mechanical properties. It is a further object of the invention to provide such polyphenylene ether resin compositions which may be used in various forms and applications.

These and additional objects and advantages are provided by the compositions according to the present invention which comprise a polyphenylene ether resin and a plasticating compound which improves the flowability of the polyphenylene ether resin. The plasticizing compound is of the formula

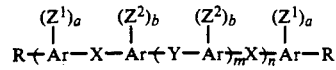

wherein X is selected from the group consisting $CH_2$, O and S; Y is selected from the group consisting of $CH_2$, O, CO, S, SO and $SO_2$; Ar is an aromatic ring; $Z^1$ and $Z^2$, are individually selected from the group consisting of alkyl, alkoxide, aryl, aryl oxide, halogen, nitrile and nitro groups; R is hydrogen or an alkyl group; m is from 0 to 3; n is from 1 to about 10; and a and b are individually from 0 to 4; provided both X and Y are not simultaneously oxygen. The compositions may optionally include a styrene resin. It has been discovered that the compositions according to the present invention exhibit improved flowability together with good mechanical properties. The compositions according to the present invention may be easily formed into sheet materials, foamed materials, shaped articles or the like, and therefore are suitable for use in a variety of applications.

These and additional objects and advantages provided by the compositions and products according to the present invention will be more fully apparent in view of the following detailed description.

DETAILED DESCRIPTION

The polymer compositions according to the present invention comprise a polyphenylene ether resin and a plasticizing compound which improves the flowability of the compositions. Polyphenylene ether resins are well known in the art and are generally of the formula

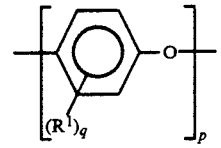

wherein each $R^1$ is individually selected from the group consisting of halogen, alkyl, aryl and alkoxy groups, each q is individually from 0 to 4 and p is at least 20. Preferably, p is at least 50. When $R^1$ comprises an alkyl group, an aryl group or an alkoxy group, the group suitably contains from 1 to about 12 carbon atoms.

The polyphenylene ether polymers suitable for use in the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875, in the Stamatoff U.S. Pat. Nos. 3,257,357 and 3,257,358, and in U.S. Pat. No. 4,935,472 of S. B. Brown et al, all of which are incorporated herein by reference. Throughout the specification and claims the term "polyphenylene ether resin" includes unsubstituted polyphenylene ether polymers, substituted polyphenylene ether polymers, polyphenylene ether copolymers and blends thereof.

Preferred polyphenylene ether polymers adapted for use in the present invention include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-propyl-1,4- phenylene)ether; poly(2,6-dipropyl-1,4-phenylene)ether; poly(2-ethyl-6-propyl-1,4-phenylene)ether; poly(2,6-dilauryl-1,4-ph-enylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6- dichloro -1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1.4-phenylene)ether; poly(3-bromo-2,6-dimethyl-1,4-phenylene)ether, copolymers thereof and mixtures thereof, and the like. Particularly preferred polyphenylene oxide polymers for use in the compositions of the present invention include poly(2,6-dimethyl-1,4-phenylene) ether, poly(2,3,6-trimethyl-1,4-phenylene)ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

The polymer compositions according to the present invention further contain a plasticizing compound which improves the flowability of the compositions. The plasticizing compound is of the formula

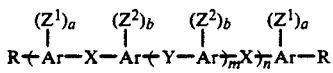

wherein X is selected from the group consisting $CH_2$, O and S; Y is selected from the group consisting of $CH_2$, O, CO, S, SO and $SO_2$; Ar is an aromatic ring; $Z^1$ and $Z^2$ are individually selected from the group consisting of alkyl, alkoxide, aryl, aryl oxide, halogen, nitrile and nitro groups; R is hydrogen or an alkyl group; m is from 0 to 3; n is from 1 to about 10; and a and b are individually from 0 to 4; provided both X and Y are not simultaneously oxygen. Preferably, when any of $Z^1$, $Z^2$ and R are carbon-containing groups, they individually contain from 1 to 12 carbon atoms. In a preferred embodiment, m is zero or 1 and n is from 1 to 5. In an additionally preferred embodiment, m is 1 and n is 1. In a further preferred embodiment, X is oxygen or $CH_2$. As is demonstrated in the examples set forth herein, suitable plasticizing compounds of the above-noted formula include, but are not limited to, 1,3-diphenoxybenzene, 4,4,-bis(2,6-dimethylphenoxy)diphenyl sulfone, 4,4,-diphenoxybenzophenone, low molecular weight copolymers of xylene and formaldehyde (commercially available as Methylon 75200 from General Electric Company), and low molecular weight, unsubstituted polyphenylene ether polymers, for example, polyphenylene ether polymers having from about 5 to less than about 20 phenylene ether repeat units and having an intrinsic viscosity of not greater than about 0.3.

The polymer compositions of the present invention include the plasticizing compound in an amount sufficient to improve the flowability of the compositions. Preferably, the plasticizing compound is included in an amount from about 0.1 to about 30 parts by weight, and more preferably from about 1 to about 15 parts by weight, per 100 parts by weight of the polyphenylene ether resin. In many instances, the plasticizing compound improves the flowability of the compositions while maintaining an advantageous combination of good mechanical properties in the compositions.

In one embodiment of the present invention, the polymer composition may further include a polystyrene resin. Various polystyrene resins are suitable for use in the compositions of the present invention. The polystyrene resins contain units derived from a styrene compound of the following formula:

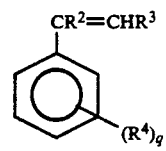

wherein $R^2$ and $R^3$ are selected from the group wherein R consisting of lower alkyl or alkenyl groups of from, for example, 1 to 6 carbon atoms and hydrogen, each $R^4$ is selected from the group consisting of halogen, hydrogen and lower alkyl or alkenyl groups of from, for example, 1 to 6 carbon atoms and q is an integer of from 0 to 5. Throughout the specification and claims the term "polystyrene resin" includes unsubstituted polystyrene, substituted polystyrene and polystyrene copolymer resins. Suitable polystyrene resins include, but are not limited to, polystyrene homopolymers including atactic polystyrenes, halogenated polystyrenes, poly-alpha-methylstyrenes, poly-paramethylstyrenes, styrene-acrylonitrile copolymers, styrene-maleic anhydride copolymers, styrene-butadiene copolymers, rubber-modified polystyrenes and the like, and mixtures thereof. These polystyrene resins and their methods of preparation are well known in the art. In a preferred embodiment, the polystyrene resin which is included in the polymer compositions of the present invention comprises a rubber-modified polystyrene resin. Rubber-modified polystyrene resins are well known in the art and may contain one or more rubber modifiers selected from diene rubbers, acrylate rubbers, natural rubbers or the like.

When the polymer compositions according to the present invention contain the polystyrene resin, the compositions may contain from about 5 to about 95 parts by weight of the polystyrene resin and from about 95 to about 5 parts by weight of the polyphenylene ether resin, based on 100 parts by weight of the combined polystyrene resin and polyphenylene ether resin. Preferably, the compositions contain from about 20 to about 80 parts by weight of the polystyrene resin and from about 80 to about 20 parts by weight of the polyphenylene ether resin, per 100 parts by weight of the polystyrene and polyphenylene ether resins combined.

The compositions according to the present invention may be produced according to any of the methods known in the art. For example, the plasticizing compound may be added to the polyphenylene ether resin prior to or during melt compounding. Additionally, the styrene resin, if included, may be combined with the polyphenylene ether resin either prior to, during or subsequent to addition of the plasticizing compound thereto. Additionally, the compositions according to the present invention may include one or more conventional additives including, but not limited to, stabilizers, antioxidants, fillers, flame retardant agents and the like.

Owing to the improved flowability of the polymer compositions of the present invention, the compositions may be formed into various products. For example, the polymer compositions of the invention may be formed into sheet materials or foamed materials, or be injection molded into shaped articles.

The following examples demonstrate various polymer compositions according to the present invention. Unless otherwise indicated, all parts and percentages set forth in the examples are by weight.

EXAMPLE 1

In this example, a series of compositions were prepared by dissolving one gram of poly(2,6-dimethyl-1,4-phenylene) ether with a measured amount of a plasticizing compound in 10 ml of chloroform. The chloroform was evaporated and the glass transition temperatures of the resulting mixtures were measured using a Perkin-Elmer DSC-4 differential scanning calorimeter. The specific plasticizing compounds employed, the parts by weight of the plasticizing compound employed per 100 parts by weight polyphenylene ether resin and the measured glass transition temperatures, Tg in °C., are set forth in Table I.

TABLE I

| Plasticizing Compound | Placticizer Concentration (phr)/Tg (°C.) | | | | |
|---|---|---|---|---|---|
| DPB[1] | 5.3/171 | 10.4/155 | 15.1/140 | 20.4/123 | 25.7/120 |
| LMWPPE[2] | 5.2/184 | 11.0/158 | 15.4/153 | 20.4/139 | 26.8/116 |
| DMPDPS[3] | 5.1/192 | 11.3/176 | 15.4/167 | 20.3/161 | 25.1/151 |
| DPBP[4] | 5.0/176 | 10.0/169 | 15.0/165 | 20.0/131 | 25.0/123 |
| Methylon[5] | 4.9/190 | 9.9/179 | 16.2/164 | 20.8/158 | 25.6/150 |

[1]DPB is 1,3-Diphenoxybenzene
[2]LMWPPE is a low molecular weight unsubstituted polyphenylene ether polymer commercially available from Monsanto
[3]DMPDPS is 4,4'-Bis(2,6 dimethylphenoxy)-diphenyl sulfone
[4]DPBP is 4,4'-Diphenoxyobenzophenone
[5]Methylon is a low molecular weight copolymer of xylene and formaldehyde commercially available from General Electric Company.

The results set forth in Table I demonstrate that there is a substantially linear relationship between the concentration of plasticizing compound and the measured glass transition temperature, thereby indicating that the polyphenylene ether resin and the plasticizing compound are miscible at the tested concentrations.

EXAMPLE 2

In this example, polymer compositions A-D comprising a polyphenylene ether resin (PPE) and a plasticizing compound according to the present invention were prepared. A comparative composition E containing only polyphenylene ether resin was also prepared. The respective amounts of polyphenylene ether resin and plasticizing compound, and the type of plasticizing compound included in each composition are set forth in Table II. The compositions were prepared by extruding the polyphenylene ether resin and the plasticizing compound, or in the case of composition E only the polyphenylene ether resin, through a Werner-Pfleiderer ZSK-30 twin screw extruder at 300° C. The resulting pellets were injected molded into ASTM test specimens using a 75 ton Newbury injection molding machine at 315° C. The tensile strength and elongation of the samples were measured according to ASTM D638, while the notched Izod impact of the test samples was measured according to ASTM D256. The glass transition temperatures of the samples were measured according to the method described in Example 1. Finally, the spiral flow of the samples was measured using the 75 ton Newbury injection molding machine at 350° C. The results of these measurements are also set forth in Table II.

TABLE II

| | Composition | | | | |
|---|---|---|---|---|---|
| | A | B | C | D | E |
| Plasticizing Compound | | | | | |
| Type | DMPDPS | DPB | DPBP | Methylon | — |
| Parts by weight | 50 | 30 | 75 | 75 | — |
| PPE, Parts by weight | 950 | 970 | 1500 | 1500 | 100% |
| Tg, °C. | 195 | 193 | 186 | 192 | 210 |
| Tensile strength (psi) | | | | | |
| Yield | 12,700 | 12,400 | 12,200 | 12,400 | 11,600 |
| Break | 8,700 | 8,500 | 9,000 | 9,000 | 9,900 |
| Elongation, % | | | | | |
| Yield | 7.4 | 7.2 | 6.5 | 6.4 | 6.9 |
| Break | 33.8 | 31.4 | 9.0 | 9.7 | 44.7 |
| Notched Izod Impact (ft-lb/in) | .74 | .74 | .50 | .59 | .78 |
| Spiral Flow, 315° C. (in) | 19.1 | 18.5 | 20.5 | 19.8 | 15.8 |

The results set forth in Table II demonstrate that compositions A-D according to the present invention exhibit improved flowability, as indicated by spiral flow, as compared with comparative composition E which did not contain the plasticizing compound according to the present invention. Additionally, although compositions A-D exhibited lower glass addition temperatures as compared with comparative composition E, compositions A-D generally exhibited a good combination of tensile strength and elongation and notched izod impact properties.

EXAMPLE 3

In this example, compositions F-I comprising a polyphenylene ether resin, a high impact polystyrene resin (HIPS) and a plasticizing compound according to the present invention were prepared. Comparative composition J containing only the polyphenylene ether resin and the high impact polystyrene resin was also prepared. The respective amounts of resins and plasticizing compound, and the type of plasticizing compound included in each composition are set forth in Table III. The resins and the plasticizing compound, or in the case of comparative composition J only the resins, were extruded through the Werner-Pfleiderer ZSK-30 twin screw extruder at 270° C. The resulting pellets were injection molded into ASTM test specimens using the Newbury injection molding machine at 275° C. The glass transition temperature, tensile strength and elongation and notched Izod impact of the samples were measured according to the procedures described in Examples 1 and 2. Additionally, the spiral flow of the samples were measured using the Newbury injection molding machine at 275° C. The results of these measurements are also set forth in Table III.

TABLE III

| | Composition | | | | |
|---|---|---|---|---|---|
| | F | G | H | I | J |
| Plasticizing Compound | | | | | |
| Type | DMPDPS | DPB | Methylon | Methylon | — |
| Parts by weight | 50 | 30 | 75 | 75 | — |
| PPE, Parts by weight | 600 | 600 | 900 | 750 | 60% |
| HIPS, Parts by weight | 350 | 370 | 525 | 475 | 40% |
| Tg, °C. | 148 | 143 | 135 | 146 | 155 |
| Tensile strength (psi) | | | | | |
| Yield | 10,000 | 10,100 | 9,900 | 10,100 | 10,500 |
| Break | 8,900 | 8,500 | 8,100 | 8,000 | 8,100 |
| Elongation, % | | | | | |
| Yield | 6.4 | 6.3 | 6.0 | 6.0 | 6.6 |
| Break | 54.7 | 46.2 | 14.5 | 12.0 | 23.7 |
| Notched Izod Impact (ft-lb/in) | 2.59 | 2.47 | 1.92 | 1.78 | 2.91 |
| Spiral Flow, 275° C. (in) | 21.5 | 21.9 | 25.0 | 24.3 | 18.7 |

The results set forth in Table III demonstrate that compositions F-I according to the present invention exhibited improved flowability, as indicated by spiral flow, as compared with comparative composition J. Additionally, the compositions according to the present invention exhibited a good combination of mechanical properties.

The preceding examples are set forth to illustrate specific embodiments of the invention and are not intended to limit the scope of the compositions and products of the present invention. Additional embodiments and advantages within the scope of the claimed invention will be apparent to one of ordinary skill in the art.

What is claimed is:

1. A polymer composition, comprising
   (a) a polyphenylene ether resin, and
   (b) a plasticizer of the formula

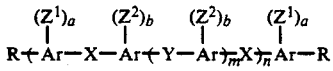

wherein X is selected from the group consisting $CH_2$, O and S; Y is selected from the group consisting of $CH_2$, O, CO, S, SO and $SO_2$; Ar is an aromatic ring; $Z^1$ and $Z^2$ are individually selected from the group consisting of alkyl, alkoxide, aryl, aryl oxide, nitrile and nitro groups; R is hydrogen or an alkyl group; m is from 0 to 3; n is from 1 to about 10; and a and b are individually from 0 to 4; provided both X and Y are not simultaneously oxygen, said plasticizer being included in an amount sufficient to improve the flowability of the composition.

2. A polymer composition as defined by claim 1, wherein the plasticizer is included in an amount of from about 0.1 to about 30 parts by weight per 100 parts by weight of the polyphenylene ether resin.

3. A polymer composition as defined by claim 2, wherein the plasticizer is included in an amount of from about 1 to about 15 parts by weight of the polyphenylene ether resin.

4. A polymer composition as defined by claim 1, wherein the polyphenylene ether resin is of the formula

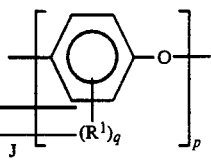

wherein each $R^1$ is individually selected from the group consisting of halogen, alkyl, aryl and alkoxy; each q is individually from 0 to 4; and p is at least 20.

5. A polymer composition as defined by claim 4, wherein p is at least 50.

6. A polymer composition as defined by claim 1, wherein the polyphenylene ether resin comprises poly(2,6-dimethyl-1,4-phenylene) ether.

7. A polymer composition as defined by claim 1, wherein the polyphenylene ether resin comprises poly(2,3,6-trimethyl-1,4-phenylene) ether.

8. A polymer composition as defined by claim 1, wherein the polyphenylene ether resin comprises a copolymer which includes units of 2,6-dimethyl-1,4-phenylene ether and units of 2,3,6-trimethyl-1,4-phenylene ether.

9. A polymer composition as defined by claim 1, wherein the polyphenylene ether resin comprises a blend of poly(2,3,6-trimethyl-1,4-phenylene) ether and poly(2,6-dimethyl-1,4-phenylene) ether.

10. A polymer composition as defined by claim 1, wherein m is zero.

11. A polymer composition as defined by claim 1, wherein m is 1.

12. A polymer composition as defined by claim 1, wherein n is from 1 to 5.

13. A polymer composition as defined by claim 1, wherein m is 1 and n is 1.

14. A polymer composition as defined by claim 1, wherein the plasticizer comprises 1,3-diphenoxybenzene.

15. A polymer composition as defined by claim 1, wherein the plasticizer comprises 4,4'-bis(2,6-dimethylphenoxy)diphenyl sulfone.

16. A polymer composition as defined by claim 1, wherein the plasticizer comprises 4,4'-diphenoxybenzophenone.

17. A polymer composition as defined by claim 1, wherein the plasticizer comprises a low molecular weight copolymer of xylene and formaldehyde.

18. A polymer composition as defined by claim 1, further including a polystyrene resin.

19. A polymer composition as defined by claim 18, wherein the polystyrene resin is rubber-modified.

20. A sheet material formed of the polymer composition of claim 1.

21. A foamed material formed of the polymer composition of claim 1.

22. A shaped article formed by injection molding the polymer composition of claim 1.

23. A sheet material formed of the polymer composition of claim 18.

24. A foamed material formed of the polymer composition of claim 18.

25. A shaped article formed by injection molding the polymer composition of claim 18.

26. A sheet material formed of the polymer composition of claim 19.

27. A foamed material formed of the polymer composition of claim 19.

28. A shaped article formed by injection molding the polymer composition of claim 19.

* * * * *